No. 633,437. Patented Sept. 19, 1899.
A. E. DULMAGE.
CREAM SEPARATOR.
(Application filed June 16, 1898.)
(No Model.)
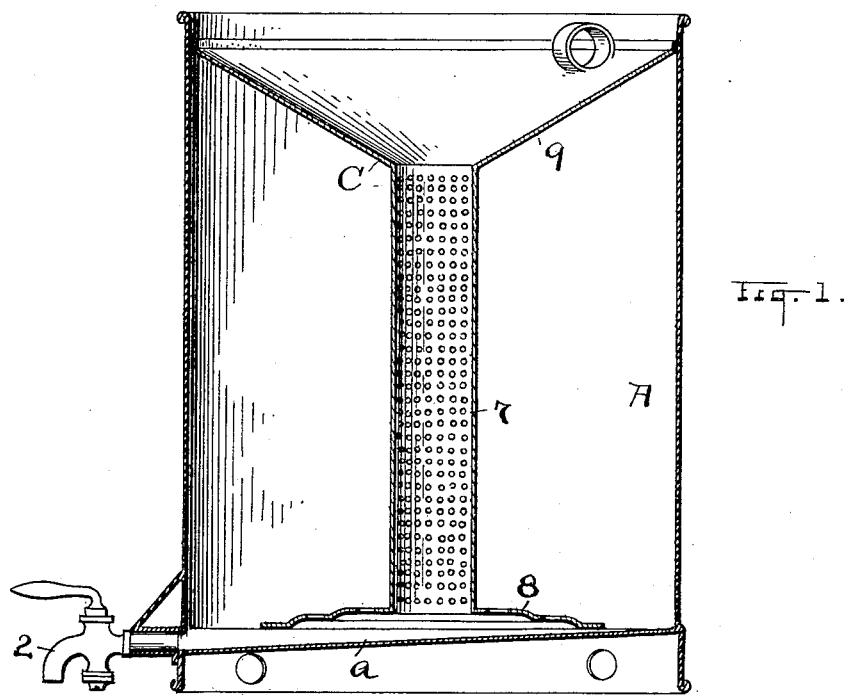
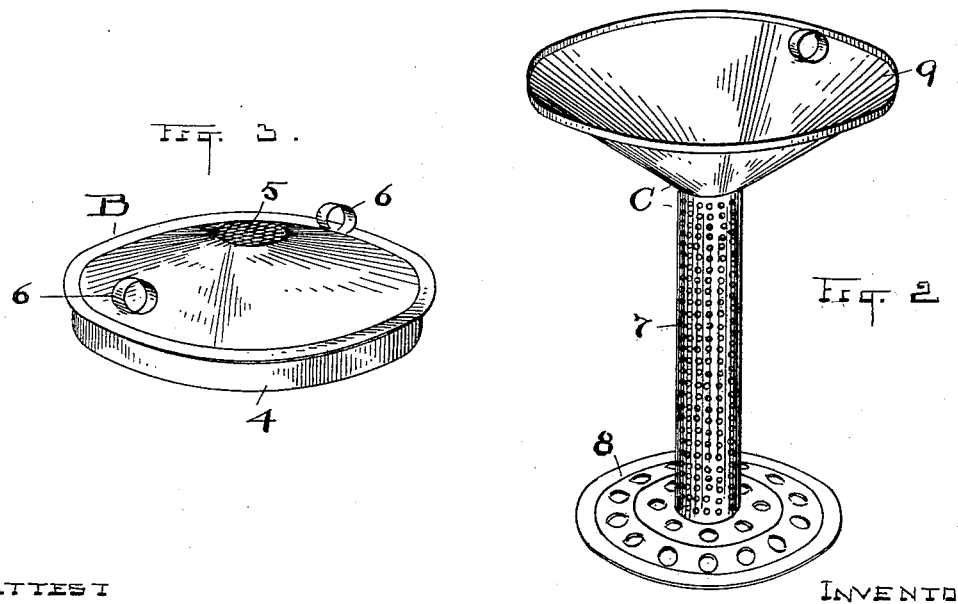
ATTEST
R. B. Moser
A. N. Moser
INVENTOR
Arthur E. Dulmage
By W. F. Fisher
ATTY

UNITED STATES PATENT OFFICE.

ARTHUR E. DULMAGE, OF OBERLIN, OHIO.

CREAM-SEPARATOR.

SPECIFICATION forming part of Letters Patent No. 633,437, dated September 19, 1899.

Application filed June 16, 1898. Serial No. 683,572. (No model.)

*To all whom it may concern:*

Be it known that I, ARTHUR E. DULMAGE, a citizen of the United States, residing at Oberlin, in the county of Lorain and State of Ohio, have invented certain new and useful Improvements in Cream-Separators for Dairies; and I do declare that the following is a full, clear, and exact description of the invention, which will enable others skilled in the art to which it appertains to make and use the same.

My invention relates to cream-separators for dairies, and the style of separator in which the invention is more particularly applicable is that in which fresh water is mixed with new milk to promote the separation and rising of the cream. Usually about as much water is added as there is milk, making a half-and-half mixture; but it is necessary in this method of precipitating or separating cream that there should be as complete admixture of the milk and water as is reasonably practicable, so that every particle of milk will be diluted, and thus more quickly and certainly surrender its cream. Hence the thorough incorporation of the water with the milk is of very great importance in this process or method of treating milk to get the cream.

My invention has therefore first of all to do with the perfect mixing of the two elements—milk and water—and then leaving the mixture to work out its own results by speedily sending the cream to the top. This leaves the milk and water, or what is called "skim-milk," sweet and ready to be drawn off for any desired use or as a waste product.

My invention therefore consists in an apparatus comprising a suitable vessel and means for mixing milk and water therein, substantially as shown and described, and particularly pointed out in the claims.

In the accompanying drawings, Figure 1 is a vertical central sectional elevation of my improved apparatus with the cap or cover removed. Fig. 2 is a perspective elevation of the mixing device alone. Fig. 3 is a perspective plan view of the top or cover for the can.

In the drawings, A represents a can, preferably a tin, though it may be substituted by an earthen jar or a jar, can, or vessel of any suitable kind, and is provided with a faucet 2 at its bottom, through which the contents are drawn off. The bottom $a$ has a small channel inclined toward the faucet to facilitate draining the can, and in practical operation after the cream has risen, which usually requires only a comparatively short time—say an hour or two—the skim-milk is first drawn off and then the cream through the same faucet and both in a perfectly-sweet state.

The cover B has a rim 4 adapted to fit into the can, and its top is inclined downward from its center, in which is a milk-strainer 5. Hence the cover can be inverted and converted into a strainer. This is not claimed to be new with me, but is convenient and can be used. Finger-ears 6 serve to engage the cover by hand.

C is the fluid-mixer. This comprises a central tubular stem 7, thickly studded with fine perforations all around and provided with a preferably perforated dish-shaped base 8. Secured to the top of the tube or column 7 is a funnel-shaped mouth 9, adapted to occupy the otherwise open top of the can when in use—that is, when the milk is strained directly into the can, as some prefer to do, the strainer-top is removed and the mixer C is introduced. Then the requisite amount of water is brought and poured bodily into the mixer. The funnel or mouth 9 is of such depth and capacity that it affords a "head," which forces the water in fine innumerable jets or streams into the body of the milk horizontally. The operations thus provided for the mixing of the water with the milk are in a sense automatic or by gravity, and it is desirable to avoid as much as possible a churning effect upon the milk.

Obviously my new and improved mixer C is not necessarily limited to the particular style of can here shown, but can be used with other styles of can or jar as well, and is made and sold as an article of manufacture and sale independently of the can.

What I claim is—

1. A spraying device for mixing water with milk in a can more or less filled with the milk and consisting of a spreading base to rest on the bottom of the can, and a tubular column open through the base and at its top and provided with fine perforations uniformly and thickly scattered over its surface for injecting the water into the body of the milk at successive elevations, substantially as described.

2. As a new article of manufacture, a mixing device for cream-separator cans consisting of a tubular column open at both ends and provided with fine perforations for injecting water into the milk uniformly at successive elevations and having a perforated dish-shaped base and a flaring funnel-shaped top, substantially as described.

Witness my hand to the foregoing specification this 11th day of June, 1898.

ARTHUR E. DULMAGE.

Witnesses:
   H. E. MUDRA,
   R. B. MOSER.